Oct. 8, 1929. J. E. JANIN 1,730,509
BASE PLATE FOR CUTTING MACHINES
Filed Oct. 19, 1928  2 Sheets-Sheet 1

Inventor
J. E. Janin
By Clarence A. O'Brien
Attorney

Oct. 8, 1929.  J. E. JANIN  1,730,509
BASE PLATE FOR CUTTING MACHINES
Filed Oct. 19, 1928  2 Sheets-Sheet 2
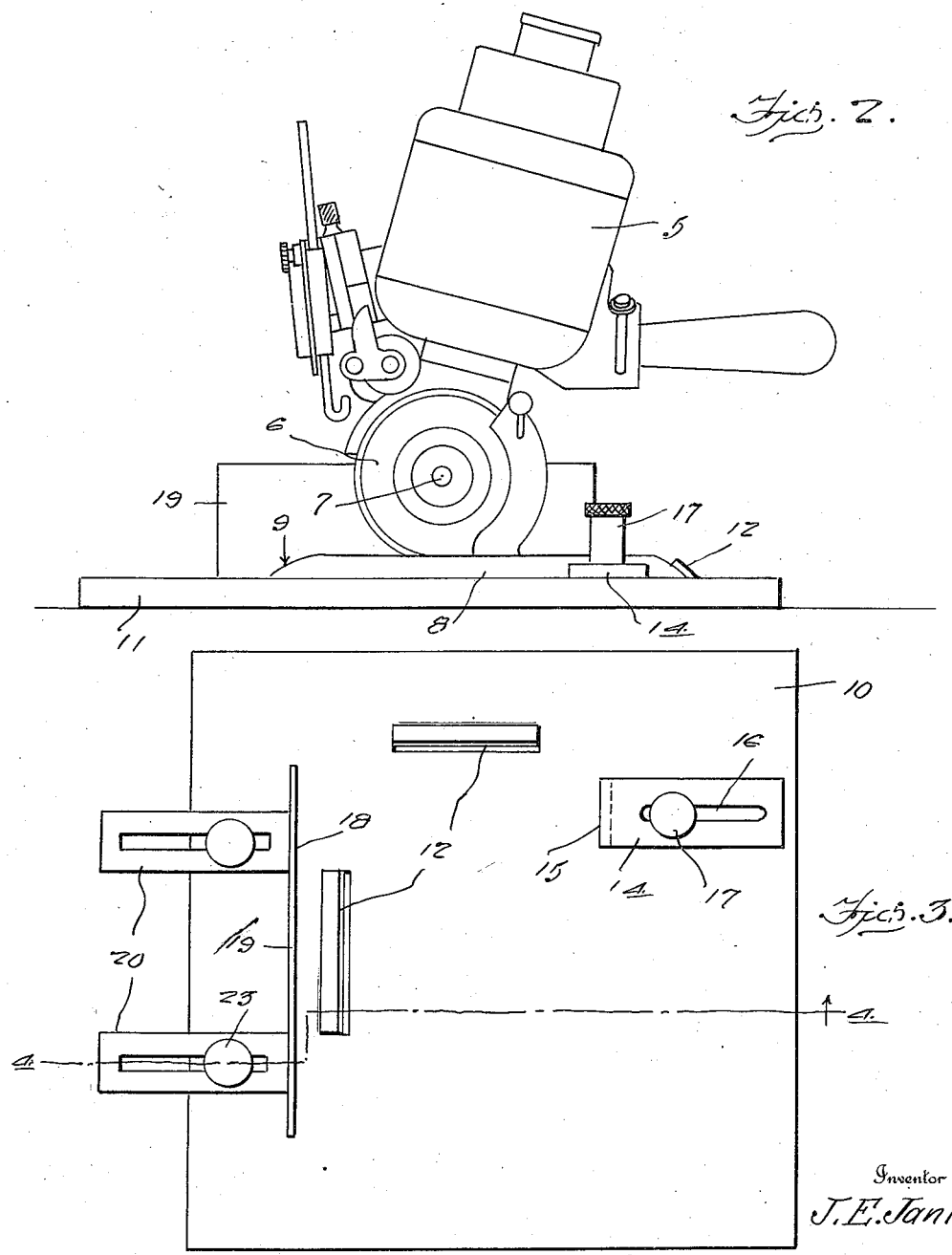
Inventor
J. E. Janin
By Clarence A. O'Brien
Attorney Patented Oct. 8, 1929

1,730,509

UNITED STATES PATENT OFFICE

JOSEPH ERNEST JANIN, OF NEW ORLEANS, LOUISIANA

BASE PLATE FOR CUTTING MACHINES

Application filed October 19, 1928. Serial No. 313,548.

The present invention relates to base plates for cutting machines and has for its principal object to provide an article of this character embodying means for detachably supporting the machine in operative position upon the plate and at the same time embodying an adjustable guide for the work as the same is fed into cutting position with the machine.

The invention is adapted particularly for use in connection with cutting machines employed for the cutting of strips into relatively short lengths, such as for instance the cutting of belt loops generally employed for attaching to trousers for supporting the belt in position thereon.

In preparing these belt loops for attaching to the garment it is necessary to cut the same in uniform length from strips of tape or other fabric and this work has heretofore been accomplished by marking the tape in the desired length and cutting the same by hand with shears. Such practice is entirely unsatisfactory due to the time required and it is accordingly the purpose of the present invention to provide a cutting base for supporting a motor driven cutter and through the use of which the tape may be tied in bundles and fed into cutting position with respect to the machine for cutting the same into the desired length.

One of the important objects of the invention is to provide a cutting base of this character which may be detachably associated with the cutting machine and thus to form a support for the machine so as to leave both hands of the operator free for feeding the work into cutting positions.

A further important object of the present invention is to provide means carried by the plate for adjusting the work with respect to the cutter whereby to cut the material into the desired length.

Other objects and advantages reside in the special construction, combination and arrangement of the various elements forming the invention as more fully hereinafter described and claimed, reference being had to the accompanying drawings forming part hereof, wherein like numerals refer to like parts throughout, and in which:

Figure 2 is a side elevational view thereof,

Figure 3 is a top plan view of the cutting plate with the cutting machine removed therefrom.

Figure 1:
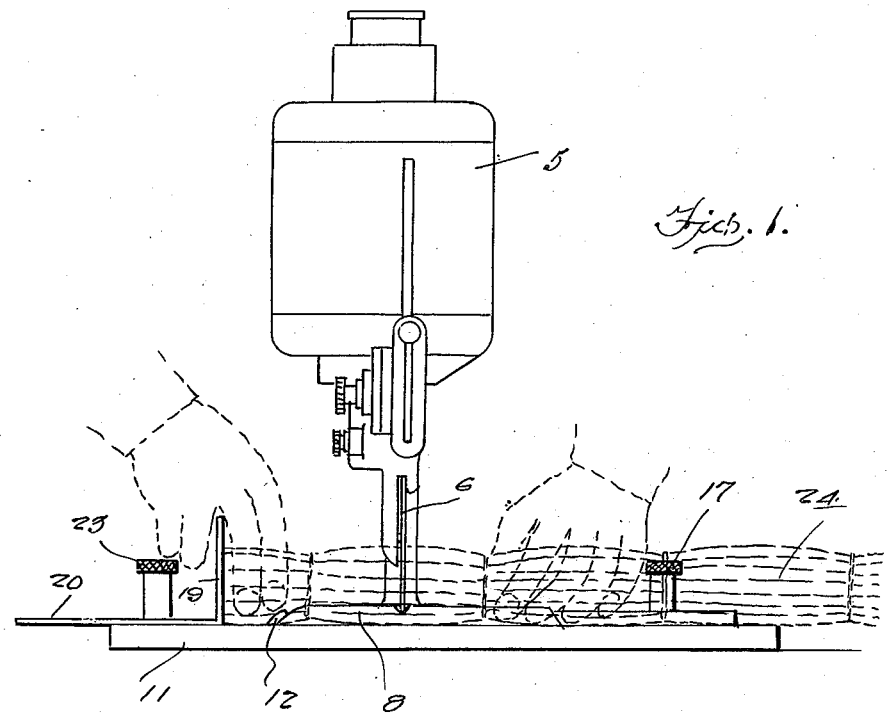
Figure 1 is a front elevational view showing the device in operative position.

Referring now to the drawing in detail, wherein for the purpose of illustration I have disclosed a preferred embodiment of the invention, the numeral 5 designates a motor driven cutting machine of conventional construction having a cutting blade 6 mounted for rotation at its lower portion upon a horizontally disposed shaft 7, the machine being supported upon a base 8.

Figure 4:
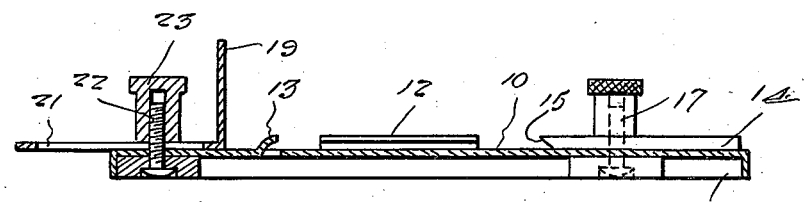
Figure 4 is a transverse sectional view taken substantially along a line 4—4 of Figure 3.

The edges of the base 8 are beveled as shown at 9, in Figure 2 of the drawings. The base 8 of the cutting machine is adapted to rest upon the upper surface of a cutting plate 10, which plate is preferably constructed of sheet material with its edges bent downwardly as shown at 11 to support the plate in a slightly elevated position. Clamping lugs 12 are struck up from the plate and bent slightly toward the center of the plate in a substantially arcuate shaped formation, as shown at 13 in Figure 4 of the drawings and under the edges of which the beveled edges 9 of the base 8 are adapted to be seated.

One edge of the base 8 is adapted for engagement by a clamping member 14 having its clamping edge undercut as illustrated at 15 for seating upon the beveled edge of the base, said clamping member also being provided with a slotted opening 16 through which to receive the upwardly extending end of an adjusting screw 17 carried by the plate 10.

Through the position of the clamping lugs 12 and the adjustable clamping member 14, the base 8 for the cutting machine may be securely fastened in position upon the upper surface of the plate 10.

An adjustable work guide 18 is mounted upon the plate 10, at the side thereof opposite from the clamping member 14 and comprises a substantially U-shaped guide member including an upstanding guide plate 19 from one side of which extends a pair of horizontally disposed, spaced parallel adjusting arms 20.

Each of the adjusting arms 20 is provided with a longitudinally extended slotted opening 21 through which to receive the upper end of a screw 22 inserted upwardly through the plate 10, the arms 20 are secured in adjusted position with respect to the associated screws 22 by thumb nuts 23.

Figure 5:
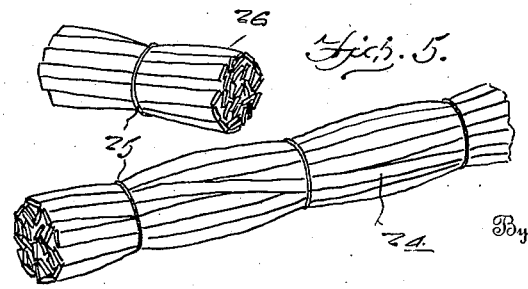
Figure 5 is a perspective view of a bundle of the strips of tape adapted to be cut into desired lengths by the cutter for forming the same into belt loops.

The upstanding guide plate 19 is disposed in position upon the plate 10 for adjustment transversely with respect to the cutting edge of the blade 6 whereby to increase or decrease the distance therebetween. The cutting blade 6 is of a type suitable for cutting strips of tape, or other fabric, tied in bunches, as illustrated at 24, in Figure 5 of the drawings so that upon placing one end of the bunch of tape against the upstanding guide 19 and drawing the work toward the knife to cut the same into predetermined length.

The bunch of material is preferably tied with cord 25 at predetermined intervals so that after the work has been cut into relatively short lengths as shown at 26. By providing the base 8 with the beveled edges 9, it will be apparent that the bundles of tape may freely ride over the edges of the base for engagement with the cutting blade 6. It will further be apparent that through the provision of the clamping lug 12 and adjustable clamping member 14 for the base, that the cutting machine 5 will be supported in position upon the base leaving both hands of the operator free to guide the work into cutting position as clearly illustrated in Figure 1 of the drawings.

It is obvious that my invention is susceptible to various changes and modifications in construction without departing from the spirit of the invention or the scope of the appended claims, and I accordingly claim all such forms of the device to which I am entitled.

Having thus described my invention, what I claim as new is:

1. An attachment for a cloth cutting machine having a cutting knife and base, said attachment including a sub-base to which the base of the machine may be secured, clamping means for fixedly attaching the base upon the upper surface of the sub-base and a work guide carried by the sub-base providing means for the feeding of the work in a predetermined manner with respect to the knife.

2. An attachment for a cloth cutting machine having a cutting knife and base, said attachment including a sub-base to which the base of the machine may be secured, clamping lugs struck up from the sub-base, an adjustable clamping member carried by the sub-base and cooperating with said lugs for securing the base in position on said sub-base and a work guide mounted on said sub-base.

3. An attachment for a cloth cutting machine having a cutting knife and base, said attachment including a sub-base to which the base of the machine may be secured, clamping lugs struck up from the sub-base, an adjustable clamping member carried by the sub-base and cooperating with said lugs for securing the base in position on said sub-base, a work guide carried by the sub-base and means for adjusting said guides with respect to the knife.

4. An attachment for a cloth cutting machine having a cutting knife and base, said attachment including a sub-base to which the base of the machine may be secured, clamping lugs struck up from the sub-base with the upper edges of said struck up portions curved inwardly in overlapping relation with respect to the edges of the base, a clamping member carried by the base and cooperating with one of said lugs for engaging the opposite edges of the base, means for adjustably securing said clamping member in position upon the base and a work guide mounted on the sub-base adjacent the side thereof opposite from said clamping member and adapted for adjustment with respect to said knife.

In testimony whereof I affix my signature.

JOSEPH ERNEST JANIN.